(12) United States Patent
Szillat et al.

(10) Patent No.: US 11,279,490 B2
(45) Date of Patent: Mar. 22, 2022

(54) AUXILIARY POWER SYSTEMS, AIRCRAFT INCLUDING THE SAME, AND RELATED METHODS

(71) Applicant: The Boeing Company, Chicago, IL (US)

(72) Inventors: John Carl Szillat, Seattle, WA (US); David Scott Krug, Woodinville, WA (US); Paul R. Tretow, Seattle, WA (US); Scott Schorn, Langley, WA (US); Royal E. Boggs, North Charleston, SC (US); Keith Douglas Choyke, Everett, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 16/238,983

(22) Filed: Jan. 3, 2019

(65) Prior Publication Data

US 2020/0216180 A1 Jul. 9, 2020

(51) Int. Cl.
*B64D 13/06* (2006.01)
*B64D 41/00* (2006.01)

(52) U.S. Cl.
CPC ...... *B64D 13/06* (2013.01); *B64D 2013/0611* (2013.01); *B64D 2013/0618* (2013.01); *B64D 2041/002* (2013.01)

(58) Field of Classification Search
CPC .............................. B64D 2013/0611; F02C 6/08
See application file for complete search history.

(56) References Cited

U.S. PATENT DOCUMENTS

| 6,306,032 B1* | 10/2001 | Scheffler | B64D 13/08 454/71 |
| 6,845,627 B1* | 1/2005 | Buck | B64D 11/04 165/919 |
| 2010/0101209 A1* | 4/2010 | Feher | F02C 7/047 60/266 |
| 2013/0098051 A1* | 4/2013 | Valdez | F02C 6/08 60/772 |
| 2019/0285324 A1* | 9/2019 | Valiquette | B64D 13/06 |

* cited by examiner

*Primary Examiner* — Katheryn A Malatek
(74) *Attorney, Agent, or Firm* — Dascenzo Gates Intellectual Property Law, P.C.

(57) ABSTRACT

Auxiliary power systems, aircraft including the same, and related methods. An auxiliary power system comprises an auxiliary power unit (APU) controller and an APU with an air intake, a powerhead, and a load compressor stage. The load compressor stage includes a flow regulator assembly, a load compressor, and a bleed air temperature (BAT) sensor for generating a BAT signal. The APU controller regulates a flow rate of a load compressor airflow through the load compressor based on the BAT signal. A method of utilizing an auxiliary power system includes compressing a load compressor airflow to generate a bleed air flow, measuring the BAT with a BAT sensor, generating a BAT signal based on the BAT, transmitting the BAT signal to an APU controller, generating a flow regulator command with the APU controller, transmitting the flow regulator command to a flow regulator assembly, and controlling a flow regulator assembly.

21 Claims, 5 Drawing Sheets

US 11,279,490 B2

AUXILIARY POWER SYSTEMS, AIRCRAFT INCLUDING THE SAME, AND RELATED METHODS

FIELD

The present disclosure relates to auxiliary power systems, aircraft including the same, and related methods.

BACKGROUND

An auxiliary power unit (APU) generally is an engine, such as a gas turbine engine, that produces outputs such as torque, electricity, and/or pressurized air to be utilized by a vehicle that carries the APU. For example, many aircraft include APUs to provide a pressurized bleed air flow to operate various aircraft systems. In such examples, it generally is desirable to keep a temperature of the bleed air flow below a threshold bleed air temperature to ensure proper operation of the systems that utilize the bleed air flow. Traditional APUs may regulate the temperature of the bleed air flow indirectly, such as by regulating a flow rate to a load compressor that generates the bleed air flow, with a reduction in flow rate generally corresponding to a lower bleed air pressure and/or temperature. The flow rate to the load compressor generally is regulated in accordance with system demands of the vehicle. In some cases, the APU also may reduce the flow rate to the load compressor responsive to a measured temperature of a gas turbine exhaust gas. For example, the APU may reduce the flow rate to the load compressor responsive to the measured exhaust gas temperature exceeding a predetermined threshold temperature. In this manner, regulating the flow rate to the load compressor responsive to the measured exhaust gas temperature may serve to protect components of the APU and/or the vehicle from damage, such as by effectively limiting a maximum temperature of the bleed air flow. However, in aircraft that have been operated extensively and/or in extreme environmental conditions, the exhaust gas temperature and the bleed air temperature may become increasingly uncorrelated, such that measurement of the exhaust gas temperature alone may not enable precise control of the bleed air temperature.

SUMMARY

Auxiliary power systems, aircraft including the same, and related methods are disclosed herein. An auxiliary power system is configured to regulate a bleed air temperature (BAT) of a bleed air flow, and comprises an auxiliary power unit (APU) configured to generate the bleed air flow and an APU controller configured to receive and transmit signals. The APU includes an air intake, a powerhead, and a load compressor stage. The powerhead is configured to receive an engine airflow from the air intake and to generate a torque. The load compressor stage is configured to receive a load compressor airflow from the air intake, and includes a flow regulator assembly, a load compressor, and a BAT sensor. The flow regulator assembly is configured to regulate a flow rate of the load air compressor airflow through the load compressor. The load compressor is configured to compress the load compressor airflow to generate a bleed air flow. The BAT sensor is configured to measure the BAT of the bleed air flow and to generate a BAT signal based, at least in part, on the BAT. The load compressor is driven, at least in part, by the torque generated by the powerhead. The APU controller is configured to receive the BAT signal from the BAT sensor, and further is configured to generate and transmit a flow regulator command to the flow regulator assembly to selectively regulate the flow rate of the load compressor airflow through the flow regulator assembly. The flow regulator command is based, at least in part, on the BAT signal.

A method of utilizing an auxiliary power system to regulate a BAT of a bleed air flow generated by an APU includes compressing a load compressor airflow to generate the bleed air flow, measuring the BAT with a BAT sensor, and generating a BAT signal based, at least in part, on the BAT. The method further comprises transmitting the BAT signal to an APU controller, generating a flow regulator command with the APU controller, and transmitting the flow regulator command to a flow regulator assembly. The generating the flow regulator command is based, at least in part, on the BAT signal. The method further comprises controlling a flow regulator assembly to regulate a flow rate of the load compressor airflow such that the controlling is based, at least in part, on the flow regulator command.

DESCRIPTION

Figure 1:
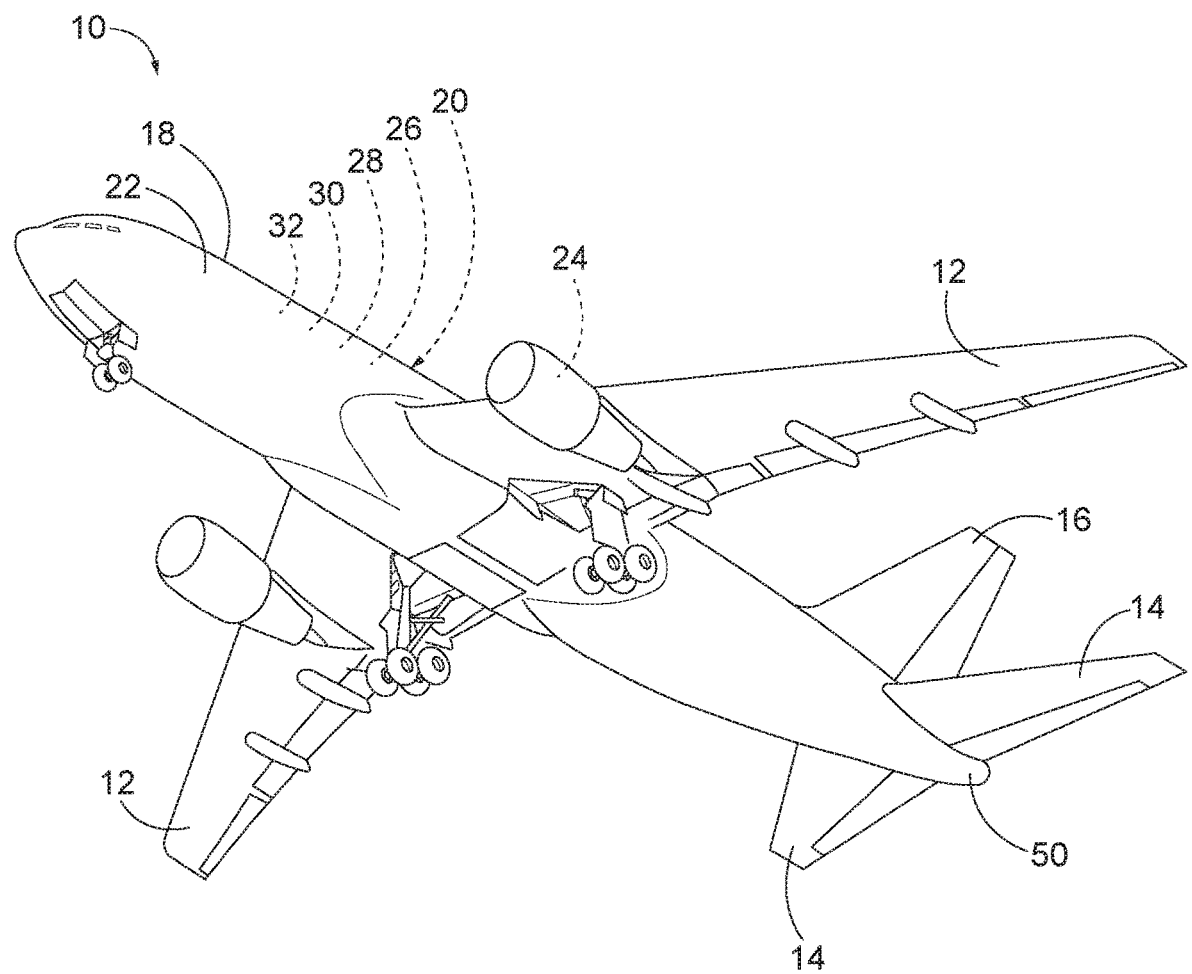
FIG. 1 is an illustration of an aircraft that may include and/or utilize auxiliary power systems and/or methods, according to the present disclosure.

FIGS. 1-8 provide illustrative, non-exclusive examples of auxiliary power systems 50 for regulating a bleed air temperature (BAT) of a bleed air flow 118, of aircraft 10 including the auxiliary power systems 50, and/or of methods 300 of utilizing an auxiliary power system 50, according to the present disclosure. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure. Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

FIG. 1 is an illustration of an aircraft 10 that may include and/or utilize auxiliary power systems 50 and/or methods 300, according to the present disclosure. As shown in FIG. 1, aircraft 10 may include one or more wings 12, a horizontal stabilizer 14, a vertical stabilizer 16, and/or an airframe 18 that defines an interior 22. As further shown in FIG. 1, and as described in more detail herein in conjunction with FIG. 8, aircraft 10 also may include a plurality of systems 20, such as may include a propulsion system 24, an electrical system 26, a hydraulic system 28, an environmental system 30, and/or a pneumatic system 32. Aircraft 10 also includes an auxiliary power system 50, examples of which are disclosed herein. Examples of aircraft 10 include an airplane, a commercial aircraft, and/or a military aircraft.

Figure 2:
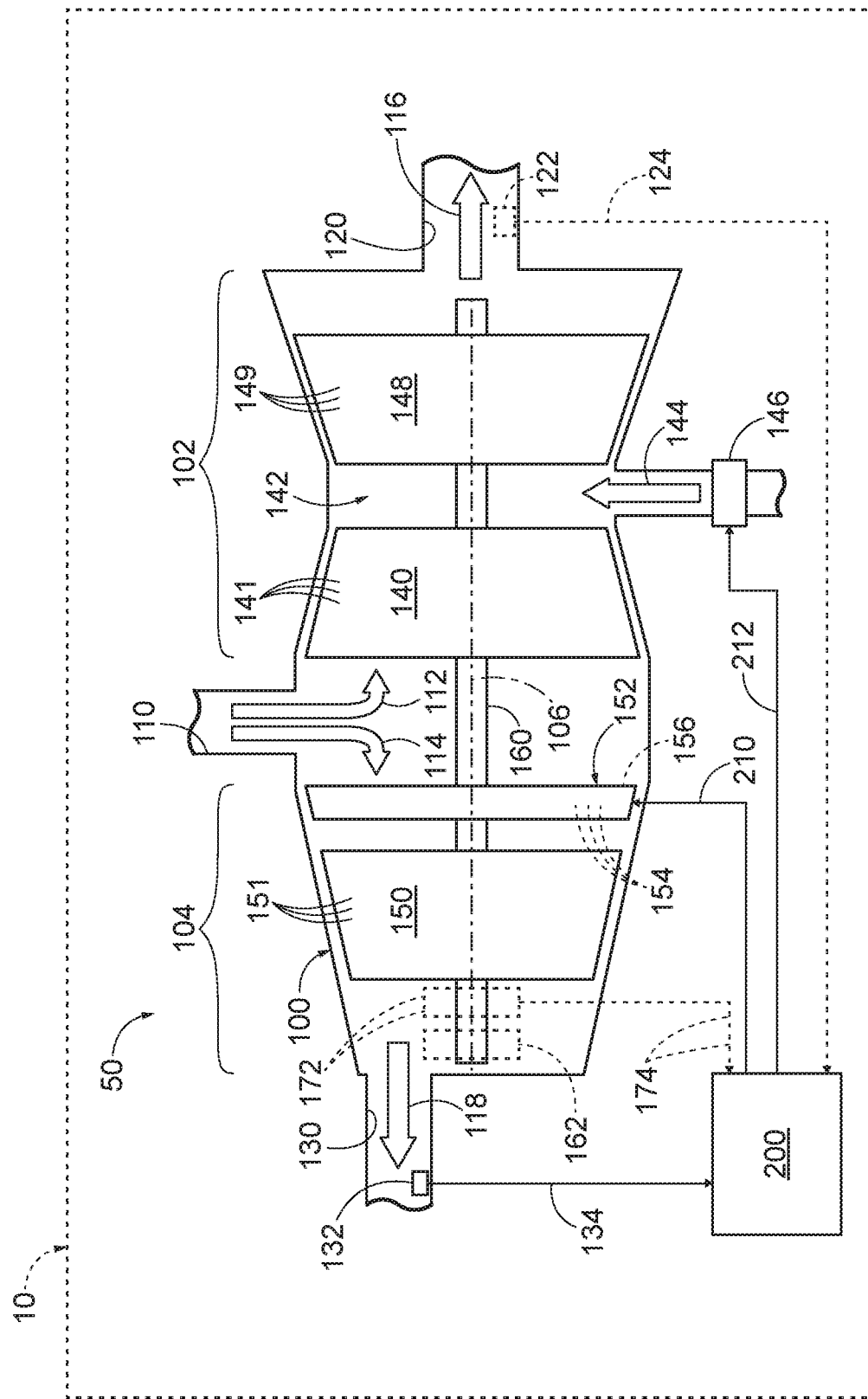
FIG. 2 is a schematic illustration of examples of auxiliary power systems according to the present disclosure.

FIG. 2 schematically illustrates examples of auxiliary power systems 50 according to the present disclosure, such as may be included in and/or structurally supported by aircraft 10. As schematically illustrated in FIG. 2, an auxiliary power system 50 includes an auxiliary power unit (APU) 100 configured to generate a bleed air flow 118 as well as an APU controller 200 configured to receive and transmit signals. APU 100 may include and/or exhibit any appropriate APU design, configuration, and/or functionality, such as may be known in the art of aviation. For example, APU 100 may be configured to generate bleed air flow 118 to serve as a source of pressurized air, such as may be utilized by one or more systems 20 such as environmental system 30 and/or pneumatic system 32. In some examples, and as schematically illustrated in FIG. 2, APU 100 also may include a generator 162 configured to generate electrical power, such as may be utilized by one or more systems 20 such as electrical system 26. In an example in which bleed air flow 118 is utilized by one or more systems 20, it may be desirable to maintain a temperature of bleed air flow 118 below a threshold temperature to ensure optimal operation of systems 20 that utilize bleed air flow 118. Accordingly, and as described herein, auxiliary power systems 50 generally are configured to regulate a temperature of bleed air flow 118, such as by maintaining the temperature of bleed air flow 118 below a threshold temperature.

APU controller 200 may include and/or be any suitable device or devices that are configured to perform the functions of APU controller 200 discussed herein. For example, APU controller 200 may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure.

As schematically illustrated in FIG. 2, APU 100 includes an air intake 110, a powerhead 102, and a load compressor stage 104. As further schematically illustrated in FIG. 2, powerhead 102 is configured to receive an engine airflow 112 from air intake 110, while load compressor stage 104 is configured to receive a load compressor airflow 114 from air intake 110. While FIG. 2 schematically illustrates air intake 110 as being a single undivided conduit, this is not required to all examples of APU 100, and it is additionally within the scope of the present disclosure that air intake 110 may include and/or be a partitioned structure, such as to segregate engine airflow 112 and load compressor airflow 114 from one another.

APU 100 generally is configured such that powerhead 102 drives load compressor stage 104 to produce bleed air flow 118. Specifically, powerhead 102 is configured to generate a torque that is provided and/or transmitted to load compressor stage 104 to generate bleed air flow 118. More specifically, and as schematically illustrated in FIG. 2, load compressor stage 104 includes a load compressor 150 configured to receive the torque from powerhead 102 and to compress load compressor airflow 114 to generate bleed air flow 118.

Powerhead 102 may include and/or be any appropriate structure and/or mechanism for generating the torque to drive load compressor 150. For example, and as schematically illustrated in FIG. 2, load compressor may include a powerhead compressor 140 configured to compress engine airflow 112, a combustion chamber 142 configured to mix and combust engine airflow 112 with a fuel flow 144, and/or a powerhead turbine 148 configured to generate the torque from engine airflow 112. In such examples, and as schematically illustrated in FIG. 2, combustion chamber 142 may be described as being positioned downstream of powerhead compressor 140 with respect to engine airflow 112, and/or powerhead turbine 148 may be described as being positioned downstream of combustion chamber 142 with respect to engine airflow 112. In this manner, powerhead 102 generally is configured to generate the torque to drive load compressor 150 via combustion of a compressed engine airflow 112. More specifically, combustion of a mixture of engine airflow 112 and fuel flow 144 within combustion chamber 142 energizes the mixture and produces combustion products that drive powerhead turbine 148 to produce the torque to drive load compressor 150.

Auxiliary power system 50 may be configured to deliver and/or regulate fuel flow 144 in any appropriate manner. For example, and as schematically illustrated in FIG. 2, auxiliary power system 50 additionally may include a fuel pump 146 configured to regulate fuel flow 144 delivered to combustion chamber 142. In such an example, APU controller 200 additionally may be configured to generate and transmit a fuel pump command 212 to selectively control a flow rate of fuel flow 144 produced by fuel pump 146.

As further schematically illustrated in FIG. 2, auxiliary power system 50 and/or APU 100 additionally may include an exhaust outlet 120 configured to direct an exhaust flow 116 away from powerhead turbine 148. As described herein, exhaust flow 116 may include, be, and/or correspond to any appropriate flow of air, fuel, combustion products, and/or other fluid associated with powerhead 102. For example, exhaust flow 116 may include and/or be a portion and/or an entirety of engine airflow 112 and/or fuel flow 144 downstream of powerhead compressor 140, combustion chamber 142, and/or powerhead turbine 148. With continued reference to FIG. 2, auxiliary power system 50 additionally may include an exhaust gas temperature (EGT) sensor 122 configured to measure an EGT of exhaust flow 116 and to generate and transmit an EGT signal 124 to APU controller 200. That is, EGT sensor 122 may be configured to measure the EGT and to generate EGT signal 124 based, at least in part, on the EGT. In this manner, flow regulator command 210 may be based, at least in part, on EGT signal 124. EGT sensor 122 may include and/or be any appropriate apparatus for measuring the EGT, examples of which include a thermocouple and/or a resistance temperature detector.

APU 100 may be configured to transmit the torque from powerhead 102 (and/or powerhead turbine 148) to load compressor stage 104 (and/or load compressor 150) in any appropriate manner. For example, and as schematically illustrated in FIG. 2, APU 100 may include a shaft 160 that extends along a central axis 106 and that is configured to transmit the torque from powerhead 102 to load compressor 150. More specifically, shaft 160 may be configured to rotate about central axis 106 to transmit the torque from powerhead 102 to load compressor 150. In such examples, shaft 160 may be described as interconnecting powerhead 102 and load compressor stage 104. As a more specific example, powerhead turbine 148 and load compressor 150 each may be fixedly mounted to shaft 160, such that a torque exerted on shaft 160 by powerhead turbine 148 corresponds directly to a torque exerted on load compressor 150 by shaft 160. As used herein, the torque exerted on shaft 160 by powerhead 102 and/or powerhead turbine 148 may be referred to as a positive torque. Similarly, a torque exerted on shaft 160 by load compressor stage 104 and/or load compressor 150 may be referred to as a negative torque. Stated differently, load compressor stage 104 and/or load compressor 150 may operate to at least partially restrict and/or oppose rotation of shaft 160 about central axis 106. In an example of auxiliary power system 50 that includes generator 162, generator 162 also may be described as exerting a negative torque on shaft 160. When present, and as schematically illustrated in FIG. 2, generator 162 may be operatively coupled to shaft 160 in any appropriate manner. For example, generator 162 may be mounted on and/or operatively coupled to an accessory gearbox that is operatively coupled to shaft 160.

Powerhead turbine 148 may include and/or be any appropriate structure for converting a flow of load compressor airflow 114 into the positive torque. As an example, and as schematically illustrated in FIG. 2, powerhead turbine 148 may include a plurality of powerhead turbine rotor blades 149, such as may be fixedly coupled to shaft 160 and/or may be configured to rotate and/or revolve about central axis 106 responsive to a flow of load compressor airflow 114. Similarly, powerhead compressor 140 may include and/or be any appropriate structure for utilizing the positive torque to compress and/or accelerate engine airflow 112. As examples, powerhead compressor 140 may be configured as an axial compressor and/or as a centrifugal compressor. Additionally or alternatively, and as schematically illustrated in FIG. 2, powerhead compressor 140 may include a plurality of powerhead compressor rotor blades 141, such as may be fixedly and/or operatively coupled to shaft 160 and/or may be configured to rotate and/or revolve about central axis 106 to accelerate engine airflow 112 responsive to powerhead turbine 148 exerting the positive torque on shaft 160. In a similar manner, load compressor 150 may include and/or be any appropriate structure for utilizing the positive torque to compress and/or accelerate load compressor airflow 114. As examples, load compressor 150 may be configured as an axial compressor and/or as a centrifugal compressor. Additionally or alternatively, and as schematically illustrated in FIG. 2, load compressor 150 may include a plurality of load compressor rotor blades 151, such as may be fixedly and/or operatively coupled to shaft 160 and/or may be configured to rotate and/or revolve about central axis 106 to accelerate load compressor airflow 114 responsive to powerhead turbine 148 exerting the positive torque on shaft 160.

As further schematically illustrated in FIG. 2, load compressor stage 104 additionally includes a flow regulator assembly 152 configured to regulate a flow rate of load compressor airflow 114 through load compressor 150. As described herein, flow regulator assembly 152 also may be described as being configured to regulate a pressure of bleed air flow 118, a flow rate of bleed air flow 118, and/or the BAT.

As used herein, the terms "upstream," "downstream," and the like refer generally to a region, a position, and/or a direction with respect to a general, overall, and/or average direction of fluid flow in a given region. As an example, load compressor 150 may be described as being positioned downstream of flow regulator assembly 152 with respect to load compressor airflow 114. Similarly, powerhead turbine 148 may be described as being positioned downstream of powerhead compressor 140 with respect to engine airflow 112.

As used herein, the term "flow rate" may refer and/or correspond to any appropriate physical property characterizing a fluid flow, such as an average flow velocity and/or a mass flow rate.

As described herein, bleed air flow 118 may include, be, and/or correspond to any appropriate flow of air produced, compressed, generated, and/or otherwise associated with load compressor stage 104. For example, bleed air flow 118 may include and/or be a portion and/or an entirety of load compressor airflow 114 downstream of load compressor 150. As discussed herein, the BAT of bleed air flow 118 may depend upon a flow rate of load compressor airflow 114 through flow regulator assembly 152. For example, load compressor 150 may operate to compress load compressor airflow 114 such that the BAT and/or a pressure of bleed air flow 118 is greater than that of load compressor airflow 114 upstream of load compressor 150. Stated differently, load compressor 150 may be configured to compress load compressor airflow 114 such that bleed air flow 118 is pressurized relative to a portion of load compressor airflow 114 upstream of load compressor 150, thereby raising the BAT relative to the portion of load compressor airflow 114 upstream of load compressor 150. Accordingly, the BAT may be at least partially based upon a rate at which load compressor airflow 114 is compressed by load compressor 150 (e.g., such as may be related to a rotational speed of load compressor 150). Additionally or alternatively, the BAT may be at least partially based upon a flow rate of load compressor airflow 114 into load compressor 150. Accordingly, regulating the flow rate of load compressor airflow 114, such as via flow regulator assembly 152 as described herein, may permit control of the BAT even when load compressor 150 operates at a constant rotational speed.

As used herein, the term "rotational speed," as used to describe a component that rotates with respect to one or more other components of auxiliary power system 50, generally refers to an angular velocity of the component, such as with respect to an axis of rotation. In an example in which the axis of rotation does not intersect the component, the term "rotational speed" additionally or alternatively may refer to a rate of revolution of the component about the axis of rotation. In the examples provided herein, a rotational speed generally refers to a rotational speed about an axis that is parallel to, collinear with, and/or identical to central axis 106. However, this is not required to all examples disclosed herein, and it is additionally within the scope of the present disclosure that a rotational speed may correspond to a rotation about an axis that is spaced apart from and/or not parallel to central axis 106.

Auxiliary power system 50 may be configured to regulate, establish, and/or maintain a rotational speed of one or more components thereof. For example, and as schematically illustrated in FIG. 2, auxiliary power system 50 may include one or more rotational speed sensors 172 configured to measure a rotational speed of one or more components of APU 100, such as a rotational speed of shaft 160, of powerhead compressor 140, of powerhead turbine 148, and/or of load compressor 150. As further schematically illustrated in FIG. 2, each rotational speed sensor 172 may be configured to generate and transmit a respective rotational speed signal 174 to APU controller 200. Each rotational speed signal 174 may include and/or correspond to a measurement of a rotational speed of one or more components of APU 100. For example, rotational speed signal 174 may include and/or correspond to a measurement of a respective rotational speed of each of one or more of powerhead compressor 140, powerhead turbine 148, and load compressor 150. As schematically illustrated in FIG. 2, rotational speed sensor 172 may be operatively coupled to shaft 160 and/or may be a component of powerhead 102. However, this is not required to all examples of auxiliary power system 50 that include rotational speed sensor 172, and it is additionally within the scope of the present disclosure that rotational speed sensor 172 may be positioned at any appropriate location within auxiliary power system 50.

In an example of auxiliary power system 50 that includes rotational speed sensor 172, APU controller 200 may be configured to generate flow regulator command 210 and/or fuel pump command 212 based, at least in part, on rotational speed signal 174. As a more specific example, APU controller 200 may be configured to generate and transmit fuel pump command 212 to fuel pump 146 responsive to rotational speed signal 174 to regulate fuel flow 144 such that a rotational speed of shaft 160 remains at least substantially constant.

Auxiliary power system 50 generally is configured to regulate a bleed air temperature (BAT) of bleed air flow 118 via selective control of flow regulator assembly 152. For example, auxiliary power system 50 may be configured to selectively and actively control flow regulator assembly 152, such as to maintain the BAT below a threshold BAT. More specifically, and with continued reference to FIG. 2, auxiliary power system 50 additionally includes a BAT sensor 132 configured to measure the BAT of bleed air flow 118. BAT sensor 132 is configured to generate a BAT signal 134 that is based, at least in part, on the BAT. As further schematically illustrated in FIG. 2, APU controller 200 is configured to receive BAT signal 134 from BAT sensor 132 and to generate a flow regulator command 210 based, at least in part, on BAT signal 134. APU controller 200 further is configured to transmit flow regulator command 210 to flow regulator assembly 152 to selectively regulate the flow rate of load compressor airflow 114 through flow regulator assembly 152, as described herein.

Auxiliary power system 50 may include and/or incorporate BAT sensor 132 in any appropriate manner. For example, APU 100 may structurally support and/or enclose BAT sensor 132. Additionally or alternatively, and as schematically illustrated in FIG. 2, auxiliary power system 50 additionally may include a bleed air conduit 130 configured to direct bleed air flow 118 away from APU 100, and BAT sensor 132 may be positioned at least partially within bleed air conduit 130. However, this is not required to all examples of auxiliary power system 50, and it is additionally within the scope of the present disclosure that BAT sensor 132 may be positioned at least partially, and optionally fully, upstream of bleed air conduit 130 with respect to bleed air flow 118. BAT sensor 132 may include and/or be any appropriate apparatus for measuring the BAT, examples of which include a thermocouple and/or a resistance temperature detector.

The BAT of bleed air flow 118 may be at least partially based upon a rotational speed of load compressor 150. Specifically, and as discussed, load compressor 150 may be configured to compress load compressor airflow 114 such that bleed air flow 118 has a higher temperature relative to a portion of load compressor airflow 114 upstream of load compressor 150. In this manner, an increase (or decrease) in the rotational speed of load compressor 150 may correspond to an increase (or decrease) in the BAT. The rotational speed of load compressor 150 may be based upon and/or equal to a rotational speed of shaft 160, of powerhead compressor 140, and/or of powerhead turbine 148. Accordingly, in such examples, varying a rotational speed of powerhead turbine 148 (such as by varying a rate of fuel flow 144 into combustion chamber 142) may serve to vary the rotational speed of load compressor 150, thereby varying the BAT. However, such a mechanism for regulating the BAT may be impractical, as it may be desirable to operate powerhead turbine 148 at a rotational speed that is at least substantially constant. Accordingly, auxiliary power system 50 may be described as being configured to regulate the BAT while powerhead turbine 148 operates at a rotational speed that is at least substantially constant. More specifically, and as described herein, as auxiliary power system 50 may be configured to regulate the BAT at least partially via selective actuation of flow regulator assembly 152.

Flow regulator assembly 152 may include and/or be any appropriate structure for regulating a flow rate of load compressor airflow 114. For example, and as schematically illustrated in FIG. 2, flow regulator assembly 152 may include a plurality of inlet guide vanes 154 and an inlet guide vane actuator 156. Specifically, inlet guide vane actuator 156 is configured to actuate the plurality of inlet guide vanes 154 to regulate load compressor airflow 114 through flow regulator assembly 152 responsive to flow regulator command 210. In such an example, flow regulator assembly 152 also may be referred to as an inlet guide vane assembly 152.

Figures 3, 4:
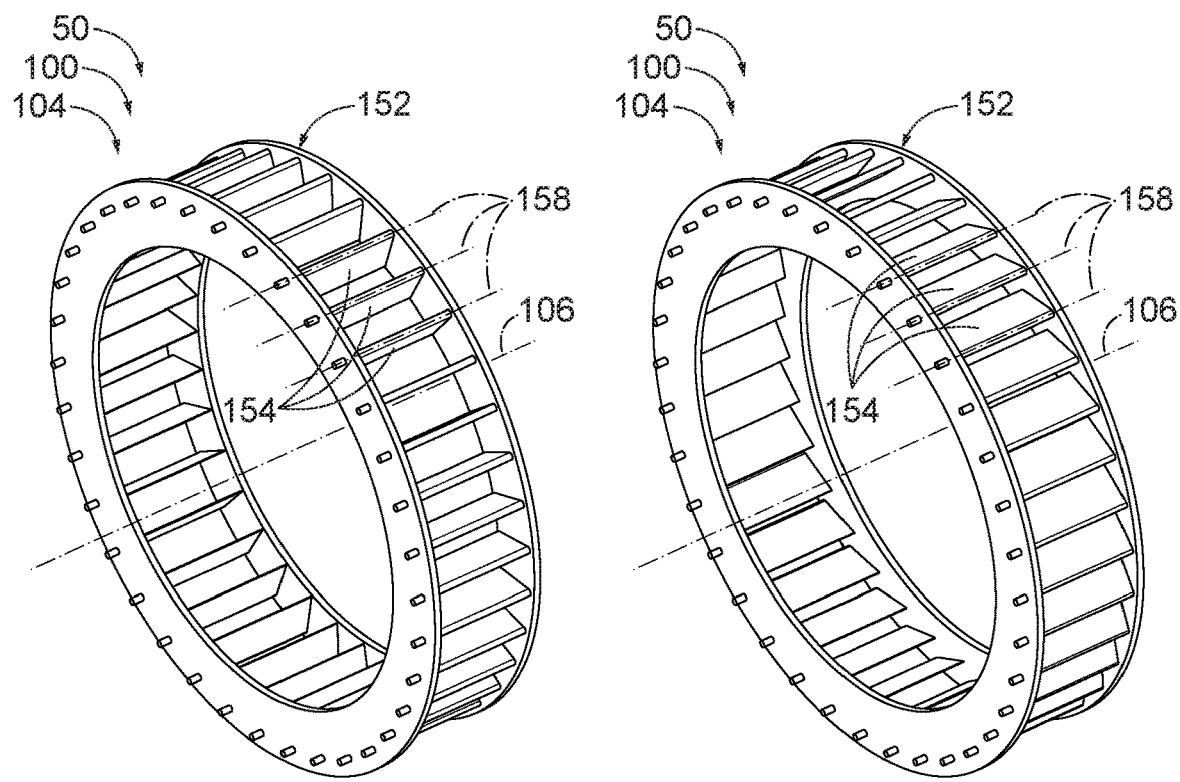
FIG. 3 is a side elevation view illustrating an example of an inlet guide vane assembly in a fully open configuration according to the present disclosure.
FIG. 4 is a side elevation view illustrating the inlet guide vane assembly of FIG. 3 in an intermediate configuration according to the present disclosure.
Figure 5:
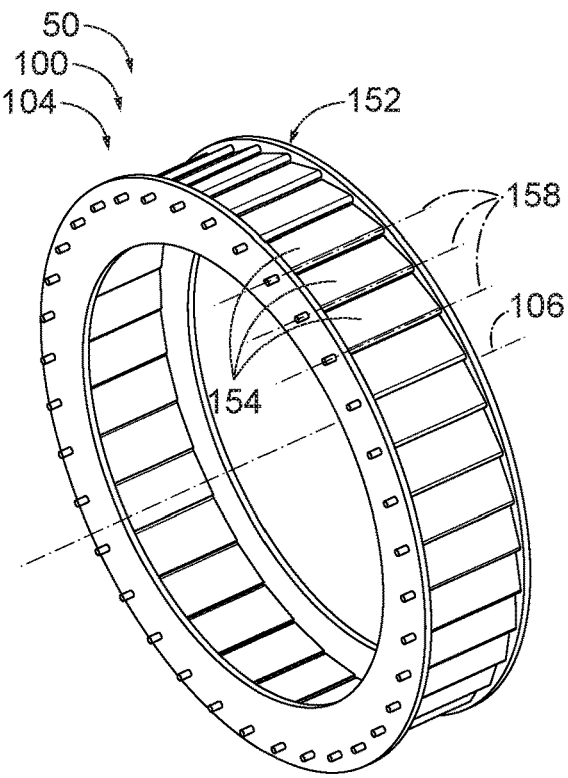
FIG. 5 is a side elevation view illustrating the inlet guide vane assembly of FIGS. 3-4 in a fully closed configuration according to the present disclosure.

FIGS. 3-5 illustrate an example of flow regulator assembly 152 that includes the plurality of inlet guide vanes 154. As illustrated in FIGS. 3-5, each inlet guide vane 154 may be configured to pivot about a respective vane pivot axis 158, such as responsive to actuation by inlet guide vane actuator 156 (not illustrated in FIGS. 3-5, to selectively regulate load compressor airflow 114 through flow regulator assembly 152. More specifically, each inlet guide vane 154 may be configured to be selectively transitioned between a fully open configuration (illustrated in FIG. 3) and a fully closed configuration (illustrated in FIG. 5) via a plurality (such as a continuous plurality and/or a continuum) of intermediate configurations (an example of which is illustrated in FIG. 4). In this manner, load compressor airflow 114 is at least substantially unimpeded by flow regulator assembly 152 when each inlet guide vane 154 is in the fully open configuration, and load compressor airflow 114 is at least substantially blocked by flow regulator assembly 152 when each inlet guide vane 154 is in the fully closed configuration. Accordingly, actuation of the plurality of inlet guide vanes 154 to a selected pivotal configuration may permit continuous variation of load compressor airflow 114 between a maximum flow rate (corresponding to the fully open configuration of inlet guide vanes 154) and a minimum flow rate (corresponding to the fully closed configuration of inlet guide vanes 154).

FIGS. 3-5 illustrate an example of flow regulator assembly 152 in which the plurality of inlet guide vanes 154 generally operate to selectively restrict the flow rate of load compressor airflow 114 traveling from an exterior of flow regulator assembly 152 radially inward through inlet guide vanes 154 to an interior of flow regulator assembly 152. Accordingly, in the example of FIGS. 3-5, the plurality of inlet guide vanes 154 is arranged such that each vane pivot axis 158 is at least substantially parallel to central axis 106 of APU 100. However, this is not required to all examples of flow regulator assembly 152, and it is additionally within the scope of the present disclosure that each vane pivot axis 158 may be at least substantially perpendicular to central axis 106 and/or may have any other appropriate orientation relative to central axis 106.

Returning to FIG. 2, APU controller 200 may be configured to regulate the BAT via any appropriate routine and/or responsive to any appropriate inputs. For example, flow regulator command 210 may be based, at least in part, on a system demand associated with one or more systems 20 of aircraft 10, such as to maintain an appropriate pressure and/or supply of bleed air flow 118. Additionally or alternatively, and as described herein, flow regulator command 210 may be based, at least in part, on one or both of BAT signal 134 and EGT signal 124, such as to ensure that the BAT remains within a desired and/or predetermined temperature range. In this manner, auxiliary power system 50 generally is configured to regulate the BAT of bleed air flow 118 independent of the rotational speed of powerhead compressor 140, of powerhead turbine 148, of load compressor 150, and/or of shaft 160. As further described herein, APU controller 200 may be configured to generate and transmit fuel pump command 212 to regulate the flow rate of fuel flow 144 via fuel pump 146, such as to regulate a rotational speed of one or more components of APU 100. As examples, and as discussed herein, fuel pump command 212 may be based, at least in part, upon rotational speed signal 174 associated with one or more of powerhead compressor 140, powerhead turbine 148, load compressor 150, and/or shaft 160, such as to maintain a substantially constant rotational speed of such component(s) during operation of APU 100. However, and as discussed, the BAT also may be at least partially based upon a rotational speed of load compressor 150, which in turn may be at least partially based upon the flow rate of fuel flow 144. Accordingly, APU controller 200 additionally or alternatively may be configured to generate fuel pump command 212 based, at least in part, on BAT signal 134 and/or EGT signal 124. Stated differently, it is within the scope of the present disclosure that APU controller 200 may be configured to regulate the BAT and/or the EGT via selective regulation of fuel flow 144, such as by generating fuel pump command 212 at least partially responsive to a measurement of the BAT and/or of the EGT.

APU controller 200 may be configured to generate flow regulator command 210 in any appropriate manner. For example, APU controller 200 may be configured to generate one or more flow regulator command components such that flow regulator command 210 is based, at least in part, on each flow regulator command component. As examples, APU controller 200 may be configured to generate a flow regulator command component associated with a difference between the BAT and the threshold BAT, a difference between the EGT and a threshold EGT, and/or a system demand associated with one or more systems 20 of aircraft 10. As more specific examples, APU controller 200 may be configured to generate each flow regulator command component via a respective proportional-integral-derivative (PID) algorithm, such as may be known to the art of systems control. In such examples, each flow regulator command component may be generated via a respective PID algorithm that utilizes a respective proportional (P) gain value, a respective integral (I) gain value, and/or a respective derivative (D) gain value. The respective P gain value, the respective I gain value, and/or the respective D gain value may be determined in any appropriate manner. For example, the respective P gain value, the respective I gain value, and/or the respective D gain value may be predetermined, such as prior to utilization of auxiliary power system 50. Additionally or alternatively, APU controller 200 maybe configured to dynamically update the respective P gain value, the respective I gain value, and/or the respective D gain value during utilization of auxiliary power system 50.

Figure 6:
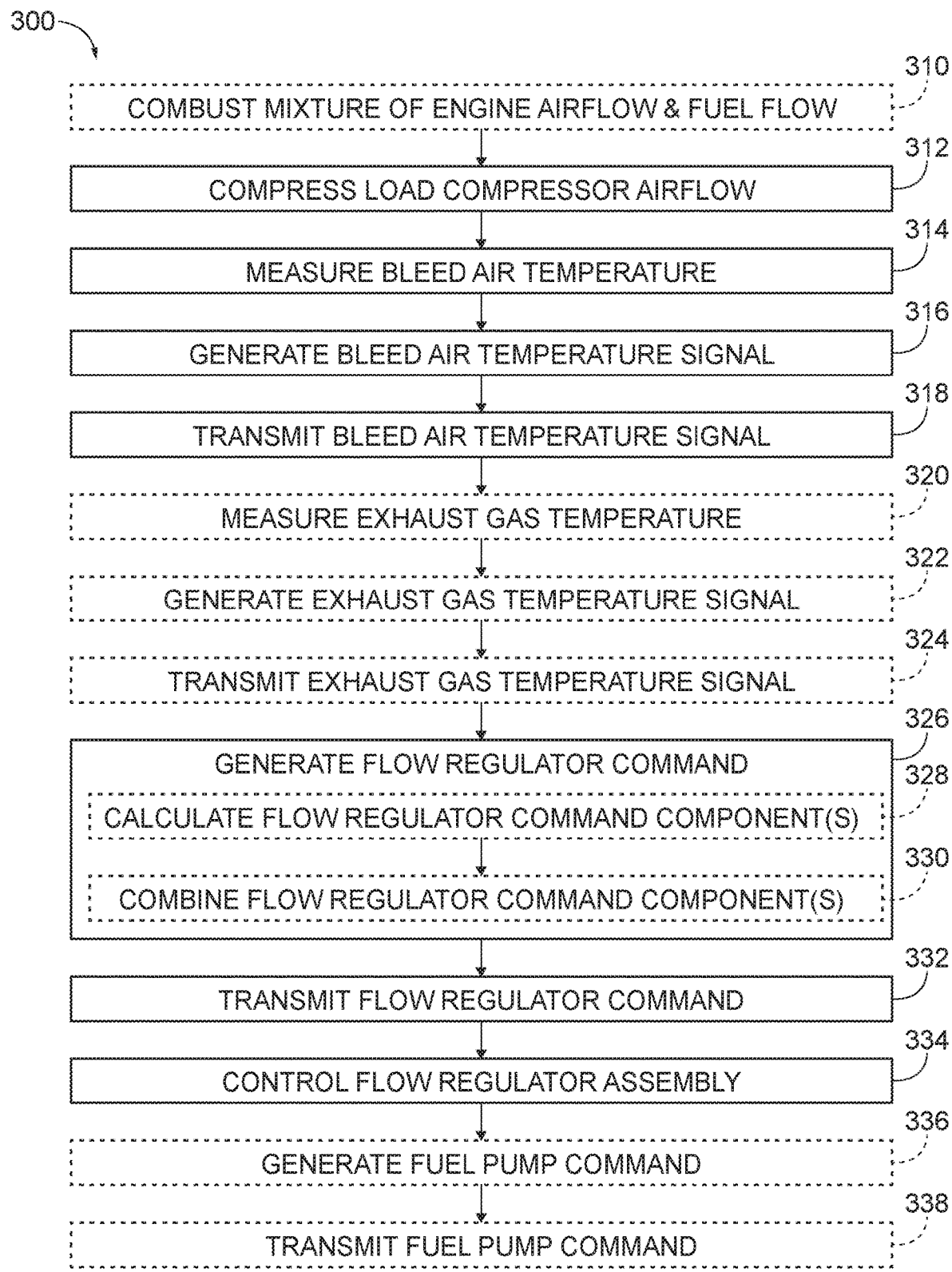
FIG. 6 is a flowchart schematically representing methods of utilizing an auxiliary power system to regulate a bleed air temperature of a bleed air flow generated by an auxiliary power unit according to the present disclosure.

FIG. 6 is a flowchart depicting methods 300, according to the present disclosure, of utilizing an auxiliary power system (such as auxiliary power system 50) to regulate a BAT of a bleed air flow (such as bleed air flow 118) generated by an APU (such as APU 100). In FIG. 6, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 6 are not limiting and other methods and steps are within the scope of the present disclosure, including methods having greater than or fewer than the number of steps illustrated, as understood from the discussions herein.

As shown in FIG. 6, methods 300 include compressing, at 312, a load compressor airflow (such as load compressor airflow 114) to generate the bleed air flow; measuring, at 314, the BAT with a BAT sensor (such as BAT sensor 132); and generating, at 316, a BAT signal (such as BAT signal 134). The generating the BAT signal at 316 is based, at least in part, on the BAT as determined in the measuring the BAT at 314.

With continued reference to FIG. 6, methods 300 additionally include transmitting, at 318, the BAT signal to an APU controller (such as APU controller 200); generating, at 326, a flow regulator command (such as flow regulator command 210), and transmitting, at 332, the flow regulator command to a flow regulator assembly (such as flow regulator assembly 152). The generating the flow regulator command at 326 includes generating such that the flow regulator command is based, at least in part, on the BAT signal.

As further shown in FIG. 6, methods 300 additionally include controlling, at 334, the flow regulator assembly to regulate a flow rate of the load compressor airflow such that the controlling at 334 is based, at least in part, on the flow regulator command. In this manner, methods 300 include regulating the BAT of the bleed air flow via selective control of the flow regulator assembly responsive to and concurrent with a measurement of the BAT. The controlling at 334 may be performed in any appropriate manner. For example, the flow regulator assembly may include a plurality of inlet guide vanes (such as inlet guide vanes 154) and an inlet guide vane actuator (such as inlet guide vane actuator 156), and the controlling at 334 may include selectively actuating the plurality of inlet guide vanes with the inlet guide vane actuator responsive to the flow regulator command.

In some examples, the generating the flow regulator command at 210 additionally may be at least partially based upon a measured temperature of an exhaust produced by the APU. For example, and as shown in FIG. 6, methods 300 additionally may include combusting, at 310, a mixture of an engine airflow (such as engine airflow 112) and a fuel flow (such as fuel flow 144) to generate an exhaust flow (such as exhaust flow 116), and further may include measuring, at 320, the EGT of the exhaust flow with an EGT sensor (such as EGT sensor 122). In such examples, methods 300 further may include generating, at 322, an EGT signal (such as EGT signal 124) with the EGT sensor based, at least in part, on the EGT, and transmitting, at 324, the EGT signal to the APU controller. In such an example, the generating the flow regulator command at 326 may be based, at least in part, on the EGT signal.

The generating the flow regulator command at 326 may be performed in any appropriate manner and/or via any appropriate routine. For example, and as shown in FIG. 6, the generating the flow regulator command at 326 may include calculating, at 328, each of one or more flow regulator command components and combining, at 330, each flow regulator command component to produce the flow regulator command. As examples, the calculating each flow regulator command component at 328 may include calculating a flow regulator command component associated with a difference between the BAT and a threshold BAT, a difference between the EGT and a threshold EGT, and/or a system demand associated with one or more systems of an aircraft (such as systems 20 of aircraft 10). The calculating each flow regulator command component at 328 may include calculating via any appropriate method and/or algorithm, such as may be known to the art of systems control. As examples, the calculating each flow regulator command component at 328 may include employing one or more of a respective proportional-integral-derivative (PID) algorithm, a respective multivariable control algorithm, and a respective minimum-variance control algorithm. As a more specific example, each flow regulator command component may be generated via a respective PID algorithm that utilizes a respective proportional (P) gain value, a respective integral (I) gain value, and/or a respective derivative (D) gain value. In such an example, the respective P gain value, the respective I gain value, and/or the respective D gain value may be determined in any appropriate manner. For example, the respective P gain value, the respective I gain value, and/or the respective D gain value may be predetermined, such as prior to execution of one or more steps of methods 300. Additionally or alternatively, the calculating each flow regulator command component at 328 may include dynamically updating the respective P gain value, the respective I gain value, and/or the respective D gain value concurrent with execution of one or more steps of methods 300. The combining each flow regulator command component at 330 also may be performed in any appropriate manner. For example, the calculating each flow regulator command component at 328 may include calculating such that each flow regulator command component includes and/or is a numerical quantity, and the combining at 330 may include calculating an arithmetic sum of the numerical quantities associated with each flow regulator command component. As another example, during nominal and/or standard operation of the APU and/or the aircraft, the flow regulator command component associated with one or more systems of the aircraft may substantially exceed flow regulator command components associated with the BAT and/or the EGT, such that the combining at 330 includes combining such that the resultant flow regulator command is substantially equal to and/or based on the flow regulator command component associated with one or more systems of the aircraft. By contrast, in a case in which the flow regulator command components associated with the BAT and/or the EGT are comparable to the flow regulator command component associated with one or more systems of the aircraft, the combining at 330 may include combining in such a manner that the flow regulator command components associated with the BAT and/or the EGT may be described as at least partially offsetting and/or overriding the flow regulator command component associated with one or more systems of the aircraft.

In some examples of methods 300, such as examples that include the combusting the mixture of the engine airflow and the fuel flow at 310, methods 300 additionally may include one or more steps directed to regulating a flow rate of the fuel flow. As examples, and as further shown in FIG. 6, methods 300 additionally may include generating, at 336, a fuel pump command (such as fuel pump command 212) with the APU controller and/or transmitting, at 338, the fuel pump command to a fuel pump (such as fuel pump 146) to regulate the flow rate of the fuel flow. In such examples, the combusting the mixture of the engine airflow and the fuel flow at 310 may be based, at least in part, on the transmitting at 338. For example, the combusting at 310 may include combusting a mixture in which a ratio (such as a mass ratio) of fuel and air is based, at least in part, on the fuel pump command transmitted during the transmitting at 338. The generating the fuel pump command at 336 may be based upon any appropriate consideration and/or input. For example, the generating at 336 may include generating the fuel pump command to maintain a substantially constant rotational speed of one or more components of the APU. In such an example, the generating at 336 may include generating the fuel pump command based, at least in part, on one or more rotational speed signals (such as rotational speed signals 174) respectively corresponding to rotational speeds of a powerhead compressor (such as powerhead compressor 140), of a powerhead turbine (such as powerhead turbine 148), of a load compressor (such as load compressor 150), and/or of a shaft (such as shaft 160).

Figure 7:
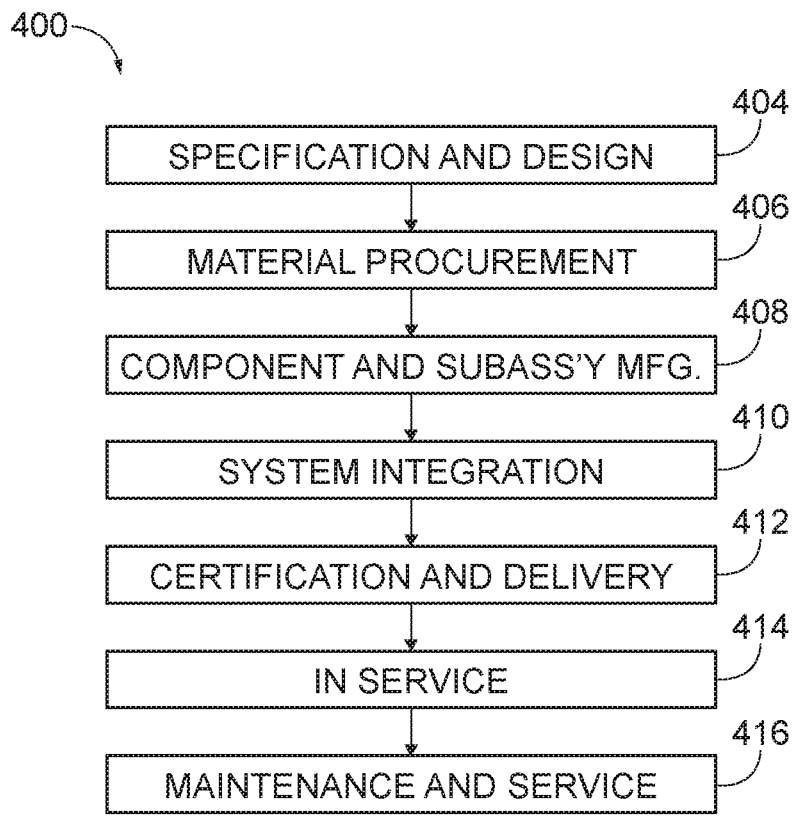
FIG. 7 is a flow diagram of aircraft production and service methodology.
Figure 8:
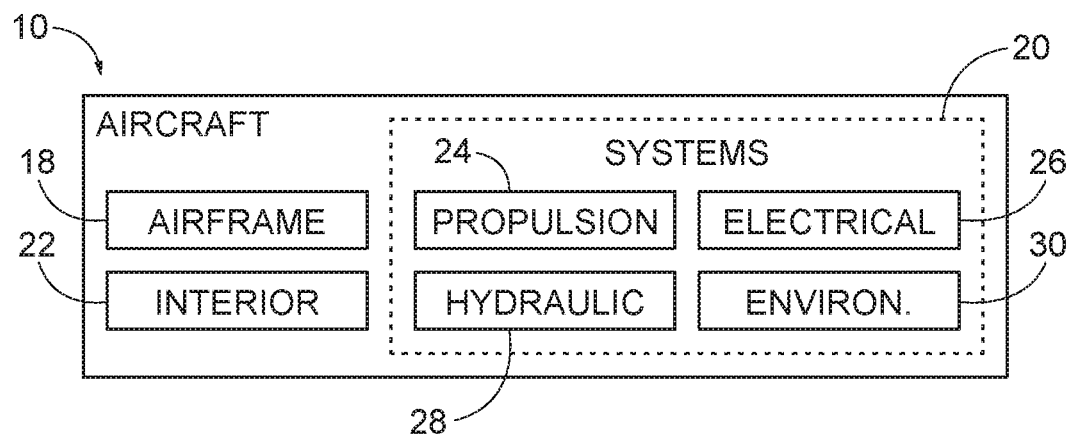
FIG. 8 is a block diagram of an aircraft.

Referring now to FIGS. 7-8, embodiments of the disclosure may be described in the context of an aircraft manufacturing and service method 400 as shown in FIG. 7 and an aircraft 10 as shown in FIG. 8. During pre-production, exemplary method 400 may include specification and design 404 of the aircraft 10 and material procurement 406. During production, component and subassembly manufacturing 408 and system integration 410 of the aircraft 10 takes place. Thereafter, the aircraft 10 may go through certification and delivery 412 in order to be placed in service 414. While in service by a customer, the aircraft 10 is scheduled for routine maintenance and service 416 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, and as discussed, the aircraft 10 produced by exemplary method 400 may include airframe 18 with a plurality of systems 20 and interior 22. Examples of high-level systems 20 include one or more of propulsion system 24, electrical system 26, hydraulic system 28, and environmental system 30. Any number of other systems may be included. Although an aerospace example is shown, the principles of the invention may be applied to other industries, such as the automotive industry.

Apparatuses and methods embodied herein may be employed during any one or more of the stages of the manufacturing and service method 400. For example, components or subassemblies corresponding to production process 408 may be fabricated or manufactured in a manner similar to components or subassemblies produced while the aircraft 10 is in service. Also, one or more apparatus embodiments, method embodiments, or a combination thereof may be utilized during the production stages 408 and 410, for example, by substantially expediting assembly of or reducing the cost of an aircraft 10. Similarly, one or more of apparatus embodiments, method embodiments, or a combination thereof may be utilized while the aircraft 10 is in service, for example and without limitation, to maintenance and service 416.

Illustrative, non-exclusive examples of inventive subject matter according to the present disclosure are described in the following enumerated paragraphs:

A1. An auxiliary power system (50) configured to regulate a bleed air temperature (BAT) of a bleed air flow (118), comprising:
  an auxiliary power unit (APU) (100) configured to generate the bleed air flow (118);
  an APU controller (200) configured to receive and transmit signals; and
  a BAT sensor (132) configured to measure the BAT of the bleed air flow (118) and configured to generate a BAT signal (134), wherein the BAT signal (134) is based, at least in part, on the BAT;
  wherein the APU (100) includes:
  an air intake (110);
  a powerhead (102) configured to receive an engine airflow (112) from the air intake (110) and to generate a torque; and
  a load compressor stage (104) configured to receive a load compressor airflow (114) from the air intake (110);
  wherein the load compressor stage (104) includes:
  a flow regulator assembly (152) configured to regulate a flow rate of the load compressor airflow (114) through the load compressor (150); and
  a load compressor (150) configured to compress the load compressor airflow (114) to generate the bleed air flow (118);
  wherein the load compressor (150) is driven, at least in part, by the torque generated by the powerhead (102); wherein the APU controller (200) is configured to receive the BAT signal (134) from the BAT sensor (132); wherein the APU controller (200) is configured to generate and transmit a flow regulator command (210) to the flow regulator assembly (152) to selectively regulate the flow rate of the load compressor airflow (114) through the flow regulator assembly (152); and wherein the flow regulator command (210) is based, at least in part, on the BAT signal (134).

A2. The auxiliary power system (50) of paragraph A1, wherein the auxiliary power system (50) is configured to selectively and actively control the flow regulator assembly (152) to maintain the BAT below a threshold BAT.

A3. The auxiliary power system (50) of any of paragraphs A1-A2, wherein the flow regulator assembly (152) is configured to regulate one or more of a pressure of the bleed air flow (118), a flow rate of the bleed air flow (118), and the BAT.

A4. The auxiliary power system (50) of any of paragraphs A1-A3, wherein the bleed air flow (118) includes, and optionally is, a portion, and optionally an entirety, of the load compressor airflow (114) downstream of the load compressor (150).

A5. The auxiliary power system (50) of any of paragraphs A1-A4, wherein the APU (100) further includes a shaft (160) that extends along a central axis (106) and that is configured to transmit the torque from the powerhead (102) to the load compressor (150).

A6. The auxiliary power system (50) of any of paragraphs A1-A5, wherein the powerhead (102) includes:
  a powerhead compressor (140) configured to compress the engine airflow (112);
  a combustion chamber (142) positioned downstream of the powerhead compressor (140) with respect to the engine airflow (112) and configured to mix and combust the engine airflow (112) with a fuel flow (144); and
  a powerhead turbine (148) positioned downstream of the combustion chamber (142) with respect to the engine airflow (112) and configured to generate the torque from the engine airflow (112).

A7. The auxiliary power system (50) of paragraph A6, when dependent from paragraph A5, wherein the powerhead turbine (148) and the load compressor (150) each are fixedly mounted on the shaft (160).

A8. The auxiliary power system (50) of any of paragraphs A6-A7, wherein the powerhead turbine (148) is configured to operate at a powerhead turbine rotational speed, and wherein the auxiliary power system (50) is configured to regulate the BAT while the powerhead turbine rotational speed remains at least substantially constant.

A9. The auxiliary power system (50) of any of paragraphs A6-A8, when dependent from paragraph A5, wherein the powerhead turbine (148) includes a plurality of powerhead turbine rotor blades (149) fixedly coupled to the shaft (160), wherein the plurality of powerhead turbine rotor blades (149) are configured to rotate about the central axis (106) responsive to a flow of the load compressor airflow (114).

A10. The auxiliary power system (50) of any of paragraphs A6-A9, when dependent from paragraph A5, wherein the powerhead compressor (140) includes a plurality of powerhead compressor rotor blades (141) fixedly coupled to the shaft (160), wherein the plurality of powerhead compressor rotor blades (141) are configured to rotate about the central axis (106) to accelerate the engine airflow (112) responsive to the powerhead turbine (148) exerting the torque on the shaft (160).

A11. The auxiliary power system (50) of any of paragraphs A6-A10, when dependent from paragraph A5, wherein the load compressor (150) includes a plurality of load compressor rotor blades (151) fixedly coupled to the shaft (160), wherein the plurality of load compressor rotor blades (151) are configured to rotate about the central axis (106) to accelerate the load compressor airflow (114) responsive to the powerhead turbine (148) exerting the torque on the shaft (160).

A12. The auxiliary power system (50) of any of paragraphs A1-A11, wherein the APU (100) structurally supports the BAT sensor (132).

A13. The auxiliary power system (50) of any of paragraphs A1-A12, further comprising a bleed air conduit (130) configured to direct the bleed air flow (118) away from the APU (100).

A14. The auxiliary power system (50) of paragraph A13, wherein the BAT sensor (132) is positioned at least partially within the bleed air conduit (130).

A15. The auxiliary power system (50) of any of paragraphs A13-A14, wherein the BAT sensor (132) is positioned at least partially, and optionally fully, upstream of the bleed air conduit (130) with respect to the bleed air flow (118).

A16. The auxiliary power system (50) of any of paragraphs A1-A15, wherein the BAT sensor (132) includes, and optionally is, one or more of a thermocouple and a resistance temperature detector.

A17. The auxiliary power system (50) of any of paragraphs A1-A16, wherein the flow regulator assembly (152) includes a plurality of inlet guide vanes (154) and an inlet guide vane actuator (156), wherein the inlet guide vane actuator (156) is configured to selectively actuate the plurality of inlet guide vanes (154) to regulate the load compressor airflow (114) through the flow regulator assembly (152) responsive to the flow regulator command (210).

A18. The auxiliary power system (50) of paragraph A17, wherein each inlet guide vane (154) of the plurality of inlet guide vanes (154) is configured to pivot about a respective vane pivot axis (158) to selectively regulate the load compressor airflow (114) through the flow regulator assembly (152).

A19. The auxiliary power system (50) of paragraph A18, wherein each vane pivot axis (158) is at least substantially parallel to the central axis (106).

A20. The auxiliary power system (50) of paragraph A18, wherein each vane pivot axis (158) is at least substantially perpendicular to the central axis (106).

A21. The auxiliary power system (50) of any of paragraphs A17-A20, wherein each inlet guide vane (154) of the plurality of inlet guide vanes (154) is configured to be selectively transitioned between a fully open configuration and a fully closed configuration via a plurality, optionally a continuous plurality, of intermediate configurations; wherein the load compressor airflow (114) is at least substantially unimpeded by the flow regulator assembly (152) when each inlet guide vane (154) is in the fully open configuration; and wherein the load compressor airflow (114) is at least substantially blocked by the flow regulator assembly (152) when each inlet guide vane (154) is in the fully closed configuration.

A22. The auxiliary power system (50) of any of paragraphs A1-A21, further comprising an exhaust outlet (120) configured to direct an exhaust flow (116) away from the powerhead turbine (148).

A23. The auxiliary power system (50) of paragraph A22, wherein the exhaust flow (116) includes, and optionally is, a portion, and optionally an entirety, of the engine airflow (112) downstream of the combustion chamber (142).

A24. The auxiliary power system (50) of any of paragraphs A22-A23, wherein the exhaust flow (116) includes, and optionally is, a portion, and optionally an entirety, of the fuel flow (144) downstream of the combustion chamber (142)

A25. The auxiliary power system (50) of any of paragraphs A22-A24, further comprising an exhaust gas temperature (EGT) sensor (122) configured to measure an EGT of the exhaust flow (116) and configured to generate and transmit an EGT signal (124) to the APU controller (200), wherein the EGT signal (124) is based, at least in part, on the EGT.

A26. The auxiliary power system (50) of paragraph A25, wherein the flow regulator command (210) is based, at least in part, on the EGT signal (124).

A27. The auxiliary power system (50) of any of paragraphs A25-A26, wherein the EGT sensor (122) includes, and optionally is, one or more of a thermocouple and a resistance temperature detector.

A28. The auxiliary power system (50) of any of paragraphs A1-A27, further comprising a fuel pump (146) configured to regulate the fuel flow (144) delivered to the combustion chamber (142).

A29. The auxiliary power system (50) of paragraph A28, wherein the APU controller (200) is configured to generate and transmit a fuel pump command (212) to the fuel pump (146) to selectively control a flow rate of the fuel flow (144) produced by the fuel pump (146).

A30. The auxiliary power system (50) of paragraph A29, wherein the fuel pump command (212) is based, at least in part, on a measured rotational speed of one or more of the load compressor (150), the shaft (160), the powerhead compressor (140), and the powerhead turbine (148).

A31. The auxiliary power system (50) of any of paragraphs A29-A30, wherein the fuel pump command (212) is based, at least in part, on one or more of the BAT signal (134) and a/the EGT signal (124).

A32. The auxiliary power system (50) of any of paragraphs A1-A31, wherein the APU controller (200) is configured to generate a flow regulator command component associated with each of one or more of:
  a difference between the BAT and a/the threshold BAT;
  a difference between a/the EGT and a threshold EGT; and
  a system demand associated with one or more systems of an aircraft; and
  wherein the flow regulator command (210) is based, at least in part, on each flow regulator command component.

A33. The auxiliary power system (50) of paragraph A32, wherein the APU controller (200) is configured to generate each flow regulator command component via a respective proportional-integral-derivative (PID) algorithm that utilizes one or more of a respective proportional (P) gain value, a respective integral (I) gain value, and a respective derivative (D) gain value.

A34. The auxiliary power system (50) of paragraph A33, wherein one or more of the respective P gain value, the respective I gain value, and the respective D gain value is predetermined.

A35. The auxiliary power system (50) of any of paragraphs A33-A34, wherein the APU controller (200) is configured to dynamically update one or more of the respective P gain value, the respective I gain value, and the respective D gain value during utilization of the auxiliary power system (50).

A36. The auxiliary power system (50) of any of paragraphs A1-A35, wherein the APU (100) further includes a generator (162) configured to generate electrical power.

A37. The auxiliary power system (50) of any of paragraphs A1-A36, wherein the APU (100) further includes one or more rotational speed sensors (172), wherein each rotational speed sensor (172) is configured to measure a rotational speed of one or more components of the auxiliary power system (50).

A38. The auxiliary power system (50) of paragraph A37, wherein each rotational speed sensor (172) is configured to measure a rotational speed of one or more of the shaft (160), the powerhead compressor (140), the powerhead turbine (148), and the load compressor (150).

A39. The auxiliary power system (50) of any of paragraphs A37-A38, wherein each rotational speed sensor (172) is configured to generate and transmit a rotational speed signal (174) to the APU controller (200).

A40. The auxiliary power system (50) of paragraph A39, wherein the APU controller (200) is configured to generate one or more of the flow regulator command (210) and a/the fuel pump command (212) based, at least in part, on the rotational speed signal (174).

B1. A method of utilizing an auxiliary power system (50) to regulate a bleed air temperature (BAT) of a bleed air flow (118) generated by an auxiliary power unit (APU) (100), the method comprising:
  compressing a load compressor airflow (114) to generate the bleed air flow (118);

measuring the BAT with a BAT sensor (132);

generating a BAT signal (134) with the BAT sensor (132), wherein the generating the BAT signal (134) is based, at least in part, on the BAT;

transmitting the BAT signal (134) to an APU controller (200);

generating a flow regulator command (210) with the APU controller (200), wherein the generating the flow regulator command (210) is based, at least in part, on the BAT signal (134);

transmitting the flow regulator command (210) to a flow regulator assembly (152); and controlling the flow regulator assembly (152) to regulate a flow rate of the load compressor airflow (114), wherein the controlling is based, at least in part, on the flow regulator command (210).

B2. The method of paragraph B1, wherein the flow regulator assembly (152) includes a plurality of inlet guide vanes (154) and an inlet guide vane actuator (156), and wherein the controlling the flow regulator assembly (152) includes selectively actuating the plurality of inlet guide vanes (154) with the inlet guide vane actuator (156) responsive to the flow regulator command (210).

B3. The method of any of paragraphs B1-B2, further comprising:

combusting a mixture of an engine airflow (112) and a fuel flow (144) to generate an exhaust flow (116);

measuring an exhaust gas temperature (EGT) of the exhaust flow (116) with an EGT sensor (122);

generating an EGT signal (124) with the EGT sensor (122), wherein the generating the EGT signal (124) is based, at least in part, on the EGT; and transmitting the EGT signal (124) to the APU controller (200);

wherein the generating the flow regulator command (210) is based, at least in part, on the EGT signal (124).

B4. The method of any of paragraphs B1-B3, wherein the generating the flow regulator command (210) includes:

calculating a flow regulator command component associated with each of one or more of:

a difference between the BAT and a threshold BAT;

a difference between a/the EGT and a threshold EGT; and a system demand associated with one or more systems of an aircraft; and combining each flow regulator command component to produce the flow regulator command (210).

B5. The method of paragraph B4, wherein the calculating each flow regulator command component includes employing one or more of:

(i) a respective proportional-integral-derivative (PID) algorithm;

(ii) a respective multivariable control algorithm; and (iii) a respective minimum-variance control algorithm.

B6. The method of paragraph B5, wherein the calculating each flow regulator command component includes employing the respective PID algorithm, and wherein the respective PID algorithm utilizes one or more of a respective proportional (P) gain value, a respective integral (I) gain value, and a respective derivative (D) gain value.

B7. The method of paragraph B6, wherein one or more of the respective P gain value, the respective I gain value, and the respective D gain value is predetermined.

B8. The method of any of paragraphs B6-B7, wherein the calculating each flow regulator command component further includes dynamically updating one or more of the respective P gain value, the respective I gain value, and the respective D gain value.

B9. The method of any of paragraphs B1-B8, further comprising:

generating a fuel pump command (212) with the APU controller (200); and transmitting the fuel pump command (212) to a fuel pump (146) to regulate a flow rate of a/the fuel flow (144).

B10. The method of paragraph B9, wherein the generating the fuel pump command (212) is based, at least in part, on a rotational speed signal (174) generated by a rotational speed sensor (172).

B11. The method of any of paragraphs B9-B10, when dependent from paragraph B3, wherein the combusting a mixture of the engine airflow (112) and the fuel flow (144) to generate the exhaust flow (116) is based, at least in part, on the generating the fuel pump command (212).

B12. The method of any of paragraphs B1-B11, wherein the auxiliary power system (50) is the auxiliary power system (50) of any of paragraphs A1-A40.

C1. An aircraft (10) comprising an airframe (18) that structurally supports the auxiliary power system (50) of any of paragraphs A1-A40.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a fluid flow that is at least substantially formed from a component flow includes a fluid flow for which at least 75% of the fluid flow is formed from the component flow and also includes a fluid flow that is completely formed from the component flow. As another example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:

1. An auxiliary power system configured to regulate a bleed air temperature (BAT) of a bleed air flow, comprising:
   an auxiliary power unit (APU) configured to generate the bleed air flow;
   an APU controller configured to receive and transmit signals; and
   a BAT sensor configured to measure the BAT of the bleed air flow and configured to generate a BAT signal, wherein the BAT signal is based, at least in part, on the BAT;
   wherein the APU includes:
      an air intake;
      a powerhead configured to receive an engine airflow from the air intake and to generate a torque; and
      a load compressor stage configured to receive a load compressor airflow from the air intake;
   wherein the powerhead includes:
   a powerhead compressor configured to compress the engine airflow;
   a combustion chamber positioned downstream of the powerhead compressor with respect to the engine airflow and configured to mix and combust the engine airflow with a fuel flow; and
   a powerhead turbine positioned downstream of the combustion chamber with respect to the engine airflow and configured to generate the torque from the engine airflow;
   wherein the load compressor stage includes:
      a load compressor configured to compress the load compressor airflow to generate the bleed air flow; and
      a flow regulator assembly configured to regulate a flow rate of the load compressor airflow through the load compressor;
   wherein the auxiliary power system further comprises an exhaust outlet configured to direct an exhaust flow away from the powerhead turbine and an exhaust gas temperature (EGT) sensor configured to measure an EGT of the exhaust flow and configured to generate and transmit an EGT signal to the APU controller; wherein the EGT signal is based, at least in part, on the EGT; wherein the load compressor is positioned downstream of the flow regulator assembly with respect to the load compressor airflow; wherein the load compressor is driven, at least in part, by the torque generated by the powerhead; wherein the APU controller is configured to receive the BAT signal from the BAT sensor; wherein the APU controller is configured to generate and transmit a flow regulator command to the flow regulator assembly to selectively regulate the flow rate of the load compressor airflow through the flow regulator assembly; and wherein the flow regulator command is based, at least in part, on each of the BAT signal and the EGT signal.

2. The auxiliary power system of claim 1, wherein the auxiliary power system is configured to selectively and actively control the flow regulator assembly to maintain the BAT below a threshold BAT.

3. The auxiliary power system of claim 1, wherein the flow regulator assembly is configured to regulate one or more of a pressure of the bleed air flow, a flow rate of the bleed air flow, and the BAT.

4. The auxiliary power system of claim 1, wherein the flow regulator assembly includes a plurality of inlet guide vanes and an inlet guide vane actuator, wherein the inlet guide vane actuator is configured to selectively actuate the plurality of inlet guide vanes to regulate the load compressor airflow through the flow regulator assembly responsive to the flow regulator command.

5. The auxiliary power system of claim 4, wherein each inlet guide vane of the plurality of inlet guide vanes is configured to pivot about a respective vane pivot axis to selectively transition between a fully open configuration and a fully closed configuration via a plurality of intermediate configurations; wherein the load compressor airflow is at least substantially unimpeded by the flow regulator assembly when each inlet guide vane is in the fully open configuration; and wherein the load compressor airflow is at least substantially blocked by the flow regulator assembly when each inlet guide vane is in the fully closed configuration.

6. The auxiliary power system of claim 1, wherein the APU structurally supports the BAT sensor.

7. The auxiliary power system of claim 6, further comprising a bleed air conduit configured to direct the bleed air flow away from the APU, and wherein the BAT sensor is positioned upstream of at least a portion of the bleed air conduit with respect to the bleed air flow.

8. The auxiliary power system of claim 1, wherein the BAT sensor includes one or more of a thermocouple and a resistance temperature detector.

9. The auxiliary power system of claim 1, wherein the powerhead turbine is configured to operate at a powerhead turbine rotational speed, and wherein the auxiliary power system is configured to regulate the BAT of the bleed air flow while the powerhead turbine rotational speed remains at least substantially constant.

10. The auxiliary power system of claim 1, wherein the EGT sensor includes one or more of a thermocouple and a resistance temperature detector.

11. The auxiliary power system of claim 1, wherein the APU further comprises a shaft that extends along a central axis and that is configured to transmit the torque from the powerhead to the load compressor.

12. An aircraft comprising an airframe that structurally supports the auxiliary power system of claim 1.

13. A method of utilizing the auxiliary power system of claim 1 to regulate the BAT of the bleed air flow generated by the APU, the method comprising:
compressing the load compressor airflow to generate the bleed air flow;
measuring the BAT with the BAT sensor;
generating the BAT signal with the BAT sensor, wherein the generating the BAT signal is based, at least in part, on the BAT;
transmitting the BAT signal to the APU controller;
generating the flow regulator command with the APU controller, wherein the generating the flow regulator command is based, at least in part, on each of the BAT signal and the EGT signal;
transmitting the flow regulator command to the flow regulator assembly; and
controlling the flow regulator assembly to regulate the flow rate of the load compressor airflow, wherein the controlling is based, at least in part, on the flow regulator command.

14. The method of claim 13, wherein the flow regulator assembly includes a plurality of inlet guide vanes and an inlet guide vane actuator, and wherein the controlling the flow regulator assembly includes selectively actuating the plurality of inlet guide vanes with the inlet guide vane actuator responsive to the flow regulator command.

15. The method of claim 13, further comprising:
combusting a mixture of the engine airflow and the fuel flow to generate the exhaust flow;
measuring the EGT of the exhaust flow with the EGT sensor; generating the EGT signal with the EGT sensor, wherein the generating the EGT signal is based, at least in part, on the EGT; and
transmitting the EGT signal to the APU controller.

16. The method of claim 13, wherein the generating the flow regulator command includes:
calculating a flow regulator command component associated with one or more of:
a difference between the BAT and a threshold BAT;
a difference between the EGT and a threshold EGT; and
a system demand associated with one or more systems of an aircraft; and
combining each flow regulator command component to produce the flow regulator command.

17. The method of claim 16, wherein the calculating each flow regulator command component includes employing one or more of:
(i) a respective proportional-integral-derivative (PID) algorithm;
(ii) a respective multivariable control algorithm; and
(iii) a respective minimum-variance control algorithm.

18. The method of claim 17, wherein the calculating each flow regulator command component includes employing the respective PID algorithm; wherein the respective PID algorithm utilizes one or more of a respective proportional (P) gain value, a respective integral (I) gain value, and a respective derivative (D) gain value; and wherein the calculating each flow regulator command component further includes dynamically updating one or more of the respective P gain value, the respective I gain value, and the respective D gain value.

19. The auxiliary power system of claim 1, wherein the APU encloses the BAT sensor.

20. An auxiliary power system configured to regulate a bleed air temperature (BAT) of a bleed air flow, comprising:
an auxiliary power unit (APU) configured to generate the bleed air flow;

an APU controller configured to receive and transmit signals; and a BAT sensor configured to measure the BAT of the bleed air flow and configured to generate a BAT signal, wherein the BAT signal is based, at least in part, on the BAT;

wherein the APU includes:
an air intake;
a powerhead configured to receive an engine airflow from the air intake and to generate a torque; and
a load compressor stage configured to receive a load compressor airflow from the air intake;

wherein the powerhead includes:
a powerhead compressor configured to compress the engine airflow;
a combustion chamber positioned downstream of the powerhead compressor with respect to the engine airflow and configured to mix and combust the engine airflow with a fuel flow; and
a powerhead turbine positioned downstream of the combustion chamber with respect to the engine airflow and configured to generate the torque from the engine airflow;

wherein the load compressor stage includes:
a load compressor configured to compress the load compressor airflow to generate the bleed air flow; and
a flow regulator assembly configured to regulate a flow rate of the load compressor airflow through the load compressor;

wherein the auxiliary power system further comprises an exhaust outlet configured to direct an exhaust flow away from the powerhead turbine and an exhaust gas temperature (EGT) sensor configured to measure an EGT of the exhaust flow and configured to generate and transmit an EGT signal to the APU controller; wherein the EGT signal is based, at least in part, on the EGT;

wherein the load compressor is driven, at least in part, by the torque generated by the powerhead; wherein the APU controller is configured to receive the BAT signal from the BAT sensor; wherein the APU controller is configured to generate and transmit a flow regulator command to the flow regulator assembly to selectively regulate the flow rate of the load compressor airflow through the flow regulator assembly; wherein the flow regulator command is based, at least in part, on each of the BAT signal and the EGT signal.

21. A method of utilizing the auxiliary power system of claim 20 to regulate the BAT of the bleed air flow generated by the auxiliary power unit, the method comprising:

combusting the mixture of the engine airflow and the fuel flow to generate the exhaust flow;

measuring the EGT of the exhaust flow with the EGT sensor;

generating the EGT signal with the EGT sensor, wherein the generating the EGT signal is based, at least in part, on the EGT; and transmitting the EGT signal to the APU controller;

compressing the load compressor airflow to generate the bleed air flow;

measuring the BAT with the BAT sensor;

generating the BAT signal with the BAT sensor, wherein the generating the BAT signal is based, at least in part, on the BAT;

transmitting the BAT signal to the APU controller;

generating the flow regulator command with the APU controller, wherein the generating the flow regulator command is based, at least in part, on each of the BAT signal and the EGT signal;

transmitting the flow regulator command to the flow regulator assembly; and controlling the flow regulator assembly to regulate the flow rate of the load compressor airflow, wherein the controlling is based, at least in part, on the flow regulator command.

\* \* \* \* \*

UNITED STATES PATENT AND TRADEMARK OFFICE
CERTIFICATE OF CORRECTION

PATENT NO. : 11,279,490 B2
APPLICATION NO. : 16/238983
DATED : March 22, 2022
INVENTOR(S) : John Carl Szillat et al.

Page 1 of 1

It is certified that error appears in the above-identified patent and that said Letters Patent is hereby corrected as shown below:

On the Title Page

Item (72) add:
--Angela O'Gorman, Kirkland, WA (US)--.

Signed and Sealed this
Fifth Day of July, 2022

Katherine Kelly Vidal
*Director of the United States Patent and Trademark Office*